(12) United States Patent
Salmela et al.

(10) Patent No.: US 11,115,501 B2
(45) Date of Patent: Sep. 7, 2021

(54) GATEWAY, CLIENT DEVICE AND METHODS FOR FACILITATING COMMUNICATION BETWEEN A CLIENT DEVICE AND AN APPLICATION SERVER

(71) Applicant: Telefonaktiebolaget L M Ericsson (publ), Stockholm (SE)

(72) Inventors: Patrik Salmela, Espoo (FI); Mohit Sethi, Espoo (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 204 days.

(21) Appl. No.: 14/899,301

(22) PCT Filed: Jun. 24, 2013

(86) PCT No.: PCT/SE2013/050753
§ 371 (c)(1),
(2) Date: Dec. 17, 2015

(87) PCT Pub. No.: WO2014/209176
PCT Pub. Date: Dec. 31, 2014

(65) Prior Publication Data
US 2016/0150052 A1 May 26, 2016

(51) Int. Cl.
*G06F 15/16* (2006.01)
*H04L 29/08* (2006.01)
(Continued)

(52) U.S. Cl.
CPC .......... *H04L 67/34* (2013.01); *H04L 65/1006* (2013.01); *H04L 67/42* (2013.01);
(Continued)

(58) Field of Classification Search
CPC ..... H04L 67/34; H04L 65/1006; H04L 67/42; H04L 63/0884; H04W 4/70;
(Continued)

(56) References Cited

U.S. PATENT DOCUMENTS

2003/0211840 A1* 11/2003 Castrogiovanni ... H04M 15/745
455/405
2007/0143828 A1* 6/2007 Jeal .......................... G06F 21/34
726/4
(Continued)

FOREIGN PATENT DOCUMENTS

CN 101931533 A * 12/2010 .......... H04L 9/3226
WO 2012042300 A1 4/2012

OTHER PUBLICATIONS

English Translation for CN101931533A. (Year: 2010).*
(Continued)

*Primary Examiner* — Vivek Srivastava
*Assistant Examiner* — Karina J Garcia-Ching
(74) *Attorney, Agent, or Firm* — Rothwell, Figg, Ernst & Manbeck, P.C.

(57) ABSTRACT

It is presented a method, executed in a gateway, the gateway being arranged to facilitate communication between a client device and an application server. The method comprises the steps of: sending a request for an electronically transferable subscriber identity module, the request comprising an identifier based on an identity of the client device; receiving a response indicating that an electronically transferable subscriber identity module, generated based on the identifier, is available; downloading the electronically transferable subscriber identity; and storing the electronically transferable subscriber identity module with an association to the client device, along with any previously stored electronically transferable subscriber identity modules. A corresponding gateway, computer program and computer program product are also presented.

28 Claims, 7 Drawing Sheets

(51) Int. Cl.
*H04W 4/70* (2018.01)
*H04W 12/04* (2021.01)
*H04W 12/30* (2021.01)
*H04L 29/06* (2006.01)
*H04W 8/18* (2009.01)
*H04W 12/06* (2021.01)

(52) U.S. Cl.
CPC ............ *H04W 4/70* (2018.02); *H04W 12/04* (2013.01); *H04W 12/35* (2021.01); *H04L 63/0884* (2013.01); *H04W 8/183* (2013.01); *H04W 12/06* (2013.01)

(58) Field of Classification Search
CPC . H04W 12/0023; H04W 12/04; H04W 12/35; H04W 8/183; H04W 12/06
USPC .......................................... 709/228; 455/411
See application file for complete search history.

(56) References Cited

U.S. PATENT DOCUMENTS

| | | | |
|---|---|---|---|
| 2008/0052769 A1* | 2/2008 | Leone | H04L 63/0272 726/7 |
| 2009/0016325 A1* | 1/2009 | Al-Bakri | H04L 29/06027 370/352 |
| 2009/0077643 A1* | 3/2009 | Schmidt | H04W 8/265 726/6 |
| 2011/0167160 A1 | 7/2011 | Murakami et al. | |
| 2013/0065551 A1 | 3/2013 | Zhang et al. | |
| 2013/0148585 A1 | 6/2013 | Ohlsson et al. | |
| 2013/0205134 A1* | 8/2013 | Holtmanns | H04W 4/001 713/156 |
| 2013/0237197 A1* | 9/2013 | Ruvalcaba | H04W 8/183 455/418 |
| 2014/0315518 A1* | 10/2014 | Engelhart | H04W 12/06 455/411 |
| 2015/0304428 A1* | 10/2015 | Li | H04L 67/141 709/227 |

OTHER PUBLICATIONS

European Office Action issued in Application No. 13 742 540.1 dated Feb. 27, 2017, 7 pages.
"3rd Generation Partnership Project; Technical Specification Group Services and System Aspects; Feasibility study on the security aspects of remote provisioning and change of subscription for Machine to Machine (M2M) equipment (Release 9)", 3GPP TR 33.812, V9.2.0 (Jun. 2010), 87 pages.

\* cited by examiner

GATEWAY, CLIENT DEVICE AND METHODS FOR FACILITATING COMMUNICATION BETWEEN A CLIENT DEVICE AND AN APPLICATION SERVER

CROSS-REFERENCE TO RELATED APPLICATIONS

This application is a 35 U.S.C. § 371 National Phase Entry Application from PCT/SE2013/050753, filed Jun. 24, 2013, and designating the United States.

TECHNICAL FIELD

The technology relates to facilitating communication between a client device and an application server, and in particular the use of one or more credentials for the client device.

BACKGROUND

Capillary networks allow resource constrained client devices to communicate with application servers, using an intermediate gateway. However, the application server may require the use of credentials to allow access, e.g. for authentication or secure communication.

Conventionally, when a client device connects to the application server via a mobile communication network, credentials related to the mobile communication network, such as 3GPP ($3^{rd}$ Generation Partnership Project) credentials can be used for authentication of the client device.

However, in many cases, the client devices 2 are constrained devices, such as sensor devices or actuator devices, with low processing power, limited access to secure storage and minimal or no user interface. Such client devices might not have the resources and capabilities to store and handle credentials for secure communication with the application servers.

It would be of great benefit if there were to be some way in which client devices of a capillary network could securely connect to application servers without the client devices needing to store credentials.

SUMMARY

An object is to provide a way for client devices to use credentials without the client device needing to store the credentials.

According to a first aspect, it is presented a method, executed in a gateway, the gateway being arranged to facilitate communication between a client device and an application server. The method comprises the steps of: sending a request for an electronically transferable subscriber identity module, the request comprising an identifier based on an identity of the client device; receiving a response indicating that an electronically transferable subscriber identity module, generated based on the identifier, is available; downloading the electronically transferable subscriber identity; and storing the electronically transferable subscriber identity module with an association to the client device, along with any previously stored electronically transferable subscriber identity modules. By the gateway obtaining and storing the electronically transferable subscriber identity module with an association to the client device, the client device does not need to manage the electronically transferable subscriber identity module. This relieves the client device of having to provide secure storage in a trusted environment, which simplifies the requirements on the client device significantly. The client device communicates via the gateway anyway, so the gateway can in this way provide credentials stored in the electronically transferable subscriber identity module when needed, e.g. for identification, authentication and/or secure communication with an application server.

In the step of sending a request, the identifier may be in the form of a Session Initiation Protocol Uniform Resource Identifier, SIP URI. The SIP URI has the advantage of often being available for other purposes and is also unique.

In the step of sending a request, the request may comprise a parameter indicating a request for a new electronically transferable subscriber identity module to be generated. In this way, a new electronically transferable subscriber identity module is generated in parallel to any electronically transferable subscriber identity modules already existing for the gateway.

The method may further comprise the step of: using credentials stored in the electronically transferable subscriber identity module for authentication of the client device.

The step of downloading may comprise downloading only the electronically transferable subscriber identity module which is generated based on the identifier. This removes the need to download electronically transferable subscriber identity modules which have already been downloaded to the gateway.

The step of downloading may comprise downloading all electronically transferable subscriber identity modules associated with the gateway. This may be more efficient if the electronically transferable subscriber identity modules are used to a large degree, since many electronically transferable subscriber identity modules are downloaded at one time. Additionally, by getting all electronically transferable subscriber identity modules, the gateway can verify that everything is up-to-date, i.e. the gateway has all electronically transferable subscriber identity modules it is supposed to have and there are no extra unused electronically transferable subscriber identity modules in the gateway 1.

The electronically transferable subscriber identity module may be in the form of an Internet Protocol Multimedia Services Identity Module, ISIM. ISIMs comprise 3GPP credentials which can be used for the client device. Moreover, many ISIMs can be created in parallel to be stored in one device, i.e. the gateway in this case.

The method may further comprise the step, prior to the step of sending a request, of: receiving a registration message from the client device comprising the identity of the client device. The registration message is then the trigger for this method.

The method may further comprise the step, prior to the step of downloading, of: receiving a client connection request. The client connection request or communication, e.g. from an application server, in relation to the client connection request, can then include an indicator of a need to supply credentials. In this way, the electronically transferable subscriber identity module is only downloaded when a need to do so is established using the client connection request. Hence, no electronically transferable subscriber identity modules are generated unnecessarily.

The method may further comprise the step, prior to the step of sending a request, of: receiving a client connection request.

The method may further comprise the step of: revoking the electronically transferable subscriber identity module.

According to a second aspect, it is presented a gateway comprising: a processor; and a memory storing instructions that, when executed by the processor, causes the gateway to: send a request for an electronically transferable subscriber identity module, the request comprising an identifier based on an identity of the client device; receive a response indicating that an electronically transferable subscriber identity module, generated based on the identifier, is available; download the electronically transferable subscriber identity module; and store the electronically transferable subscriber identity module with an association to the client device, along with any previously stored electronically transferable subscriber identity modules.

The instructions to send a request may comprise instructions to include the identifier in the form of a Session Initiation Protocol Uniform Resource Identifier, SIP URI.

The instructions to send a request may comprise instructions to include, in the request, a parameter indicating a request for a new electronically transferable subscriber identity module to be generated.

The gateway may further comprise instructions to: use credentials stored in the electronically transferable subscriber identity module for authentication of the client device.

The instructions to download may comprise instructions to download only the electronically transferable subscriber identity module which is generated based on the identifier.

The instructions to download may comprise instructions to download all electronically transferable subscriber identity modules associated with the gateway.

The electronically transferable subscriber identity module may be in the form of an Internet Protocol Multimedia Services Identity Module, ISIM.

The gateway may further comprise instructions to receive a registration message from the client device comprising the identity of the client device prior to the sending a request for an electronically transferable subscriber identity module.

The gateway may further comprise instructions to receive a client connection request prior to the downloading.

The gateway may further comprise instructions to receive a client connection request prior to the sending a request for an electronically transferable subscriber identity module.

The gateway may further comprise instructions to revoke the electronically transferable subscriber identity module.

According to a third aspect, it is presented a computer program comprising computer program code which, when run on a gateway arranged to facilitate communication between a client device and an application server, causes the gateway to: send a request for an electronically transferable subscriber identity module, the request comprising an identifier based on an identity of the client device; receive a response indicating that an electronically transferable subscriber identity module, generated based on the identifier, is available; download the electronically transferable subscriber identity module; and store the electronically transferable subscriber identity module with an association to the client device, along with any previously stored electronically transferable subscriber identity modules.

The program code to send a request may comprise program code to include, in the request, a parameter indicating a request for a new electronically transferable subscriber identity module to be generated.

According to a fourth aspect, it is presented a computer program product comprising a computer program according to the third aspect and a computer readable means on which the computer program is stored.

According to a fifth aspect, it is presented a gateway comprising: means for sending a request for an electronically transferable subscriber identity module, the request comprising an identifier based on an identity of the client device; means for receiving a response indicating that an electronically transferable subscriber identity module, generated based on the identifier, is available; means for downloading the electronically transferable subscriber identity; and means for storing the electronically transferable subscriber identity module with an association to the client device, along with any previously stored electronically transferable subscriber identity modules.

The identifier may be in the form of a Session Initiation Protocol Uniform Resource Identifier, SIP URI.

The means for sending a request may comprise means for providing the request comprising a parameter indicating a request for a new electronically transferable subscriber identity module to be generated.

The gateway may further comprise means for using credentials stored in the electronically transferable subscriber identity module for authentication of the client device.

The means for downloading may comprise means for downloading only the electronically transferable subscriber identity module which is generated based on the identifier.

The means for downloading may comprise means for downloading all electronically transferable subscriber identity modules associated with the gateway.

The electronically transferable subscriber identity module may be in the form of an Internet Protocol Multimedia Services Identity Module, ISIM.

The gateway may further comprise means for receiving a registration message from the client device comprising the identity of the client device.

The gateway may further comprise means for receiving a client connection request.

The gateway may further comprise means for revoking the electronically transferable subscriber identity module.

The word 'plurality' in the description and claims is to be interpreted as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
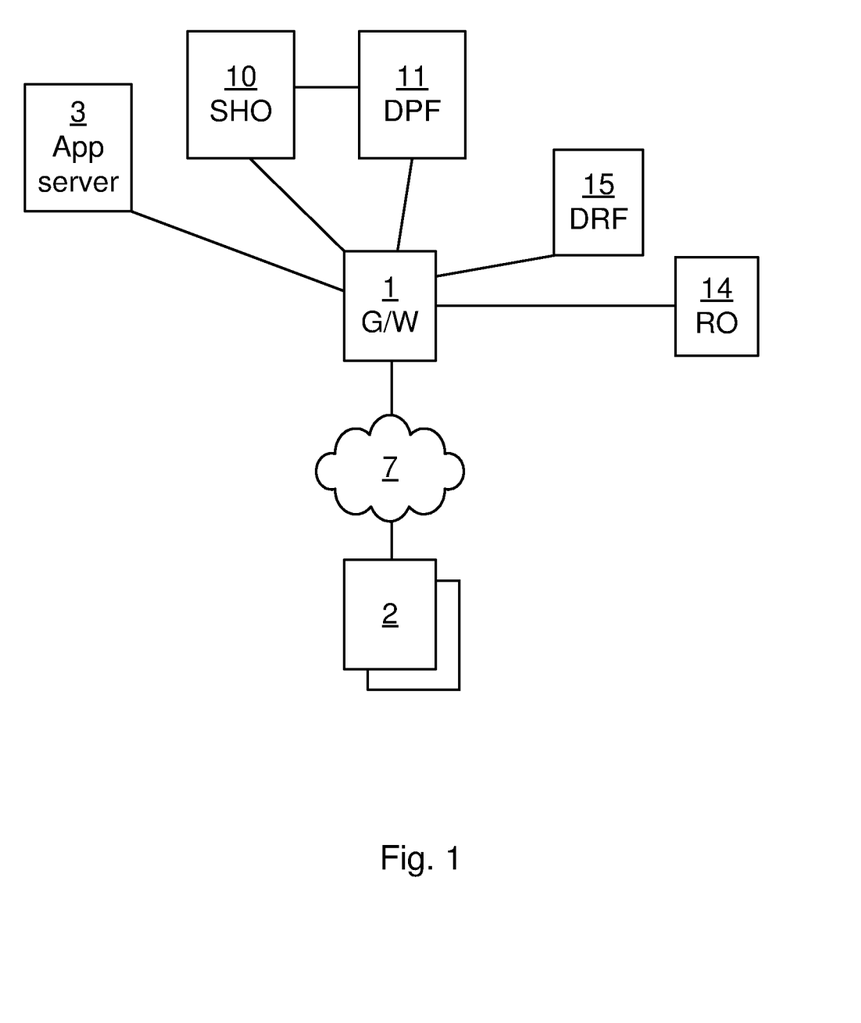
FIG. 1 is a schematic diagram illustrating environments where embodiments presented herein can be applied.

FIG. 1 is a schematic diagram illustrating environments where embodiments presented herein can be applied. A number of client devices 2 are connected via a network 7 to a gateway (G/W) 1. Each client device 2 communicates on occasion with one or more of a set of application servers 3. The connection between the client devices 2 and the gateway 1 can be wireless, e.g. using ZigBee, Wi-Fi (IEEE 802.11), Bluetooth, etc., or wired, e.g. using Ethernet, USB, a serial or parallel connection, etc. The gateway 1 and the client devices 2 can be paired to achieve a secure connection between them. This pairing can use out-of-band pairing mechanisms such as scanning public-key bar codes, pressing buttons on the gateway and devices at the same time, or entering codes etc. Alternatively, in-band pairing mechanisms can be used such as the one proposed in Gollakota, Shyamnath, et al. "Secure in-band wireless pairing." USENIX Security Sym (2011).

The client devices 2 can be constrained devices such as sensor devices and/or actuator devices, with low processing power, limited access to secure storage and minimal or no user interface. Moreover, the client devices 2 are optionally integrated in any suitable type of host device, such as a vehicle or a home electronics device e.g. media player, camera, television, etc.

The gateway 1 is in turn connected to one or more of the applications servers 3 to allow communication between the client devices 2 and the application servers 3. The application servers are of any suitable type of server and can e.g. implement a Network Application Function (NAF) as defined in 3GPP TS 33.220 V12.0.0.

To be able to perform authentication or communicate securely, the client device 2 can have access to a subscription token, such as an ISIM (Internet Protocol Multimedia Services Identity Module) or USIM (Universal Subscriber Identity Module). The ISIM or USIM can be provided using a physical card or by an electronically transferable subscriber identity module such as an MCIM (Machine Communications Identity Module), which can be downloaded from the network.

The use of MCIM to establish the credentials of users and terminals is described in more detail in 3GPP TR 33.812 V9.2.0.

The previously used solution in broad terms is to have preliminary credentials installed in the client device during manufacturing. These credentials are mapped to the selected subscription and that mapping is stored in a Discovery and Registration Function (DRF) 15 in a Registration Operator (RO) 14 to which the client device 2 can connect. During this connection, the preliminary credentials are used to find out, from the stored mapping, which is the new Selected Home Operator (SHO) 10 and where to connect to download the new credentials. The new credentials are downloaded from the MCIM Download and Provisioning Function (DPF) 11. The DPF 11 can be hosted by the RO 14 or the SHO 10, but is here shown as part of the SHO 10 in FIG. 1.

The connection between the gateway 1 and the application server 3, SHO 10 and RO 14 may occur over an IP (Internet Protocol) based network being wire based, wireless and/or using a mobile communication network. The mobile communications network may e.g. comply with any one or a combination of 3GPP ($3^{rd}$ Generation Partnership Project) standards such as LTE (Long Term Evolution) or UMTS utilising W-CDMA (Wideband Code Division Multiplex), or other standards such as CDMA2000 (Code Division Multiple Access 2000). The gateway 1 along with the network 7 and the client devices 2 are collectively called a capillary network. The connection between the gateway 1 and the application servers 3, SHO 10 and/or RO 14 may also include a connection through a wide area network such as the Internet, allowing great geographic separation between the application servers 3, SHO 10, RO 14 and the gateway 1.

The application server 3 may in some situations require identification or authentication of the client device 2 or that the communication with the client device 2 is encrypted.

The client device 2 then needs to have 3GPP credentials (or equivalent) such as in an ISIM or USIM. The client device 2 can then use the 3GPP credentials (or equivalent credentials) to obtain specific credentials for authenticating itself towards the application server 3. The client device 2 is then authenticated by the application server 3 e.g. in accordance with the Generic Bootstrapping Architecture (see 3GPP TS 33.220 V12.0.0).

Figure 2A:
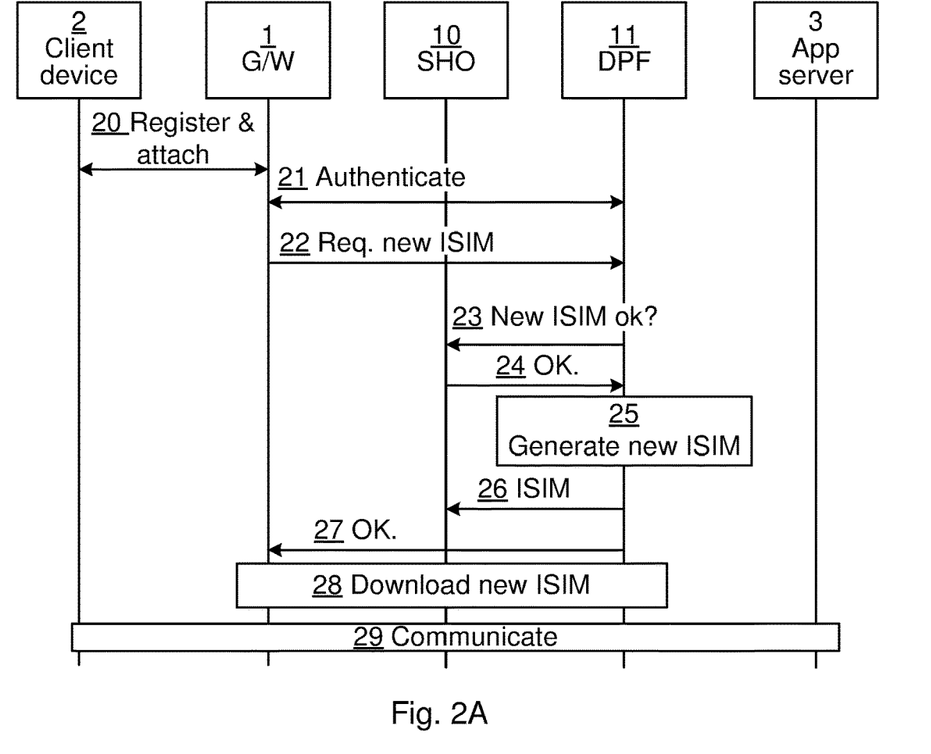
FIGS. 2A-C are sequence diagrams illustrating embodiments which can be applied in the environment shown in FIG. 1.

FIG. 2A is a sequence diagram illustrating an embodiment which can be applied in the environment shown in FIG. 1. It is to be noted that while the DPF 11 and the SHO 10 are here depicted separately, these functions can be provided within the same device, as depicted in FIG. 1 above.

When a client device 2 attaches to the network it will perform an attachment and registration process 20 with the gateway 1 serving the network.

The gateway 1 then authenticates 21 itself with the DPF 11 using its own 3GPP credentials, after which the gateway sends a request 22 to the DPF for a new electronically transferable subscriber identity module, to be associated with the client device 2 in question, and optionally also with the gateway 1, using the gateway's 1 own credentials.

In this example and other embodiments below, the ISIM is mentioned, which can be a type of MCIM. However, any suitable type of electronically transferable subscriber identity module can be used, such as another type of MCIM including the USIM. The USIM contains the regular 3GPP credentials while the ISIM is conventionally aimed for IMS (IP Multimedia Subsystem). At the time of filing this patent application, it is stated that only one USIM application at a time can be active at one time for a device. However, no such constraints are mentioned for ISIMs. Hence, in order for the gateway 1 to be able to store and utilise electronically transferable subscriber identity modules for a plurality of client devices 2, ISIMs can be used while complying with the current specifications from 3GPP. However, if multiple instances of USIMs were to be allowed for a single device, the embodiments presented herein are equally well applicable using USIMs. Consequently, while ISIMs are mentioned in the embodiments presented herein, it is to be understood that the ISIM could be replaced with any suitable electronically transferable subscriber identity module.

As a response to the request for the new ISIM 22, the DPF 11 sends a message 23 to the SHO 10 to ask if the DPF 11 is allowed to create a new ISIM. If the SHO 10 deems it acceptable, the SHO 10 responds with an OK message 24 to the DPF 11.

At this stage, the DPF 11 can generate the new ISIM 25 and send the ISIM 26 to the SHO 10. Also, the DPF 11 sends an OK message 27 to the gateway 1, indicating to the gateway 1 that the new ISIM has been generated and is available for download. Optionally, the OK message 27 is omitted and the gateway 1 starts to download the new ISIM as it becomes available.

The gateway 1 can than download the new ISIM 28 and store this ISIM with an association to the client device 2 in question. The ISIM then contains credentials associated with the client device 2.

This allows the client device 2 to communicate 29 with arbitrary services, e.g. with an application server 3. With the credentials of the ISIM, provided by the gateway 1, the client device 2 can identify and authenticate itself to any service supporting SIM (Subscriber Identity Module) based authentication, such as any suitably configured web service. All web services e.g. social networking services, financial services, etc. could be adjusted such that authentication could be provided using SIM credentials by implementing the NAF functionality. The credentials can be used both for identification/authentication and for setting up secure connections with the application server 3. In fact any current or future service in a 3GPP network and in the Internet is a candidate to use the SIM credentials.

Figure 2B:
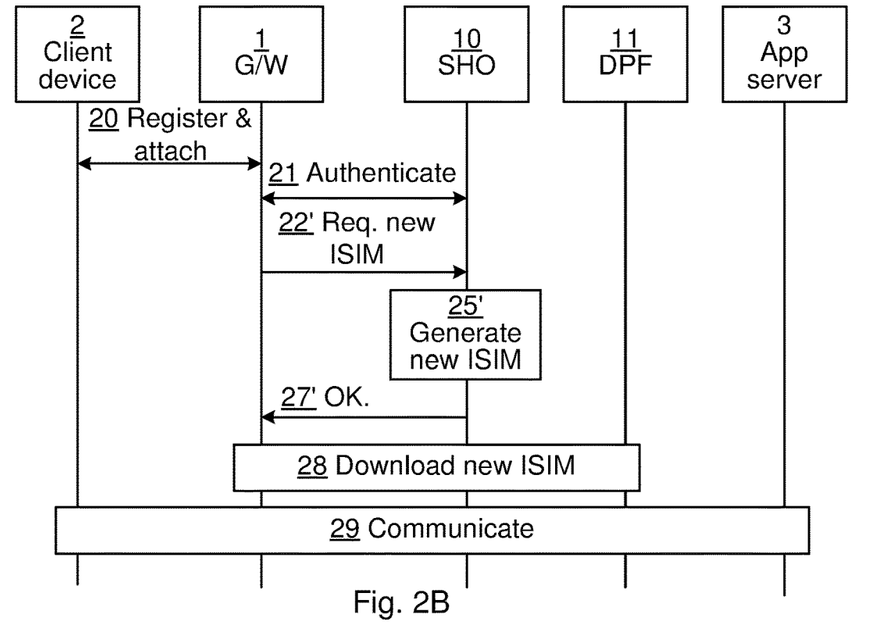

FIG. 2B is a sequence diagram illustrating an embodiment which can be applied in the environment shown in FIG. 1. The sequence diagram is similar to the one shown in FIG. 2A, but here, the SHO 10 generates the new ISIM instead of the DPF 11.

Here, the gateway sends a request for a new ISIM 22' to the SHO 10. The SHO then generates the new ISIM 25' and responds with an OK message 27' to the gateway 1.

In one embodiment (not shown) which is a combination of the sequences of FIGS. 2A and 2B, the gateway 1 authenticates 21 with the DPF 11 and the gateway 1 requests a new ISIM from the DPF. At this stage, the DPF 11 requests the SHO 10 to generate the new ISIM, the SHO 10 generates the new SIM and responds to the DPF 11 with the new ISIM. The rest of the sequence is like the sequence of FIG. 2A.

This sequence removes the need for the DPF 11 to check with the SHO 10 whether it is acceptable to generate the new ISIM, which is part of the sequence described with reference to FIG. 2A above.

Figure 2C:
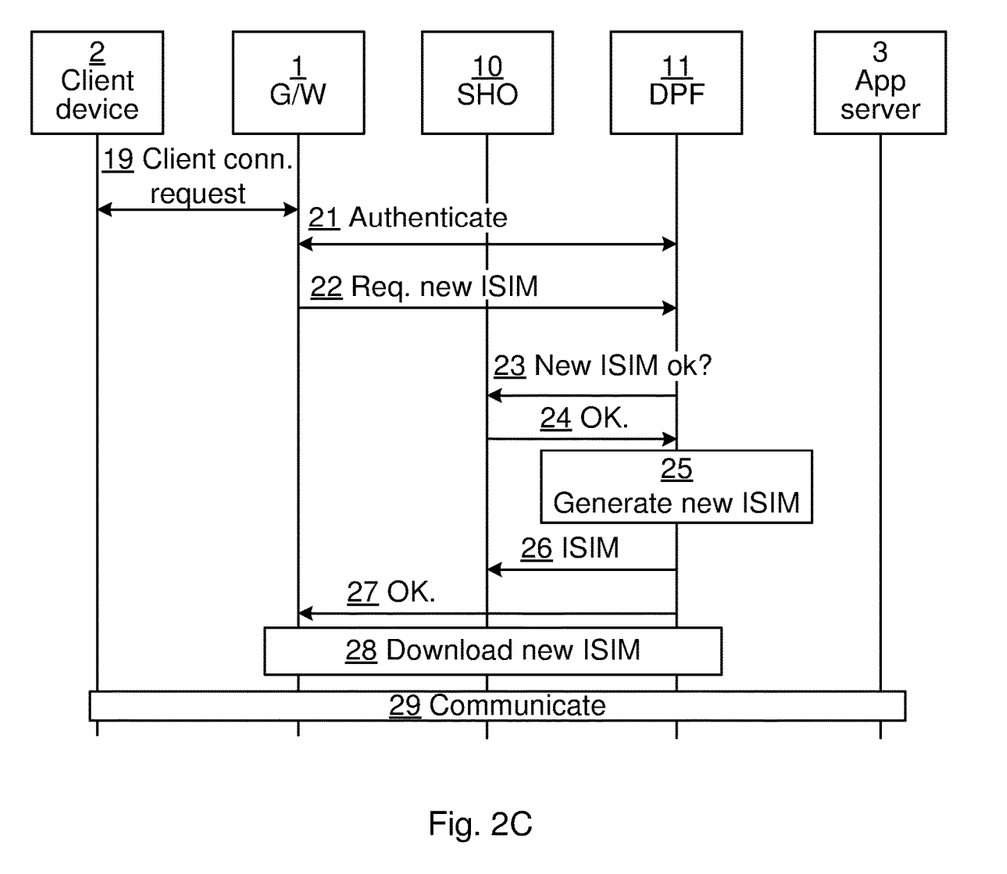

FIG. 2C is a sequence diagram illustrating an embodiment which can be applied in the environment shown in FIG. 1. The sequence diagram is similar to the one shown in FIG. 2A, but here, the trigger for the sequence is a client connection request 19. The client device 2 has then been registered prior to the sequence shown in FIG. 2C, and here sends a client connection request 19 to the gateway 1.

The client connection request 19 message can include an indication of the need for the client device to perform identification, authentication and/or secure communication with an application server 3. Alternatively, the client connection request 19 is forwarded to the application server 3 from where an executing service responds with a message that indicates that 3GPP based authentication is needed, which then triggers the remaining sequence for downloading the ISIM. In this way, the new ISIM is only generated when a need for the new ISIM arises.

FIG. 3A-E are flow charts illustrating methods for downloading an electronically transferable subscriber identity module, performed in the gateway of FIG. 1. The method is executed for a particular client device and can be executed independently, in parallel, for a plurality of client devices. First, the embodiment of FIG. 3A will be described.

Figure 3A:
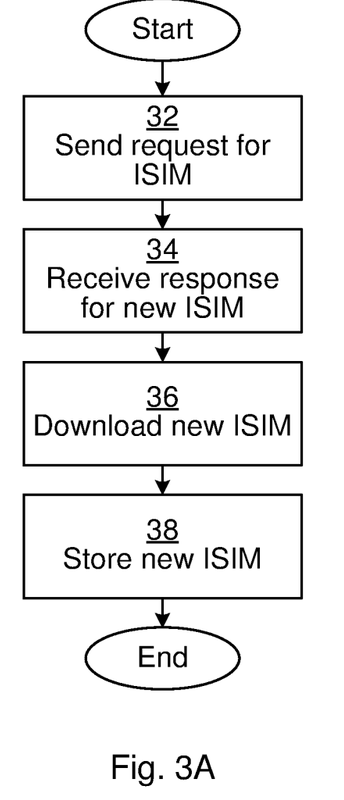
FIGS. 3A-E are flow charts illustrating methods for downloading an electronically transferable subscriber identity module, performed in the gateway of FIG. 1.

In a send request for ISIM step 32, a request for an electronically transferable subscriber identity module is sent. The request comprises an identifier based on an identity of the client device. In one embodiment, the identifier is in the form of a Session Initiation Protocol Uniform Resource Identifier, SIP URI. The SIP URI has the advantage of often being available for other purposes and is also unique. Optionally, the request comprises a parameter specifically indicating a request for a new electronically transferable subscriber identity module to be generated, which is to co-exist in parallel with any existing electronically transferable subscriber identity modules.

As described above, the electronically transferable subscriber identity module can e.g. be in the form of an Internet Protocol Multimedia Services Identity Module, ISIM, since the current specifications allow multiple ISIMs to coexist in the same device, which in our case corresponds to the gateway 1.

In a receive response for new ISIM step 34, a response is received indicating that an electronically transferable subscriber identity module is available. The electronically transferable subscriber identity module has been generated based on the identifier.

In a download new ISIM step 36 the electronically transferable subscriber identity is downloaded. In one embodiment, only the electronically transferable subscriber identity module, which is generated based on the identifier, is downloaded. In this way, only the electronically transferable subscriber identity modules in question are downloaded, removing the need to download electronically transferable subscriber identity modules which have already been downloaded to the gateway.

In another embodiment, all electronically transferable subscriber identity modules associated with the gateway are downloaded. This may be more efficient if the electronically transferable subscriber identity modules are used to a large degree, since many electronically transferable subscriber identity modules are downloaded at one time. Additionally, by getting all electronically transferable subscriber identity modules, the gateway can verify that everything is up-to-date, i.e. the gateway has all electronically transferable subscriber identity modules it is supposed to have and there are no extra unused electronically transferable subscriber identity modules in the gateway 1.

In a store new ISIM step 38 the electronically transferable subscriber identity module is stored with an association to the client device. The electronically transferable subscriber identity module is stored along with any previously stored electronically transferable subscriber identity modules, e.g. on a smartcard such as an UICC (Universal Integrated Circuit Card) or in embedded UICC in the gateway 1. In other words, the gateway can hold several electronically transferable subscriber identity modules which could respectively and independently be used by client devices for authentication, identification and/or secure communication with respective application servers 3.

Figure 3B:
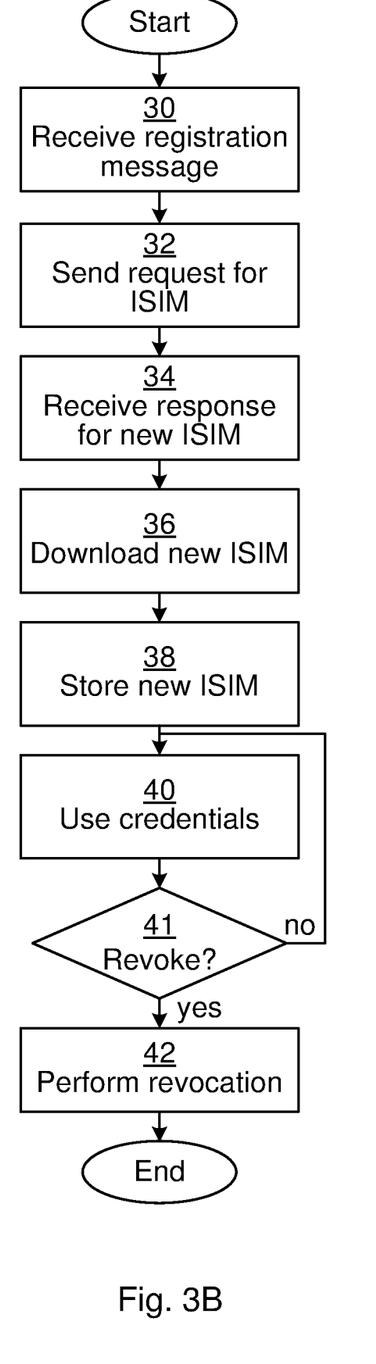

FIG. 3B is a flow chart illustrating one embodiment of a method for downloading an electronically transferable subscriber identity module. The method of FIG. 3B is similar to the method of FIG. 3A and only steps which are new or modified compared to the method of FIG. 3A are described here. In this embodiment, a trigger for requesting the ISIM is a registration message. Moreover, the embodiment of FIG. 3B also includes steps for using credentials of the ISIM and for revoking the ISIM.

Hence, prior to the send request for ISIM step 32, there is here a receive registration message 30. In this step, a registration message is received from the client device. The registration message comprises the identity of the client device 2. This identity can be used to obtain the identifier which is part of the request in the send request for ISIM step 32. In one embodiment, the identifier is the same as the identity of the client device.

After the store new ISIM step 38, there is a use credentials step 40. In this step, credentials stored in the electronically transferable subscriber identity module are used for authentication, identification and/or secure communication of the client device as described above.

After the use credentials step 40, there is a conditional revoke step 41, in which it is determined whether the ISIM for the client device is to be revoked. This can e.g. be signalled from higher layers due to the client device 2 leaving the network or for another reason. If it determined to revoke, the method continues to & perform revocation step 42. Otherwise the method returns to the use credentials step 40.

It is to be noted that the conditional revoke step 41 may be pull based, e.g. using polling to check whether the revocation should be done, or push based, e.g. based on explicit signalling indicating to revoke the electronically transferable subscriber identity module.

In the perform revocation step 42, the electronically transferable subscriber identity module for the client device is revoked. This can e.g. be performed by removing the electronically transferable subscriber identity module from the gateway or by signalling to the network to disable or delete the subscription and/or electronically transferable subscriber identity module.

Figure 3C:
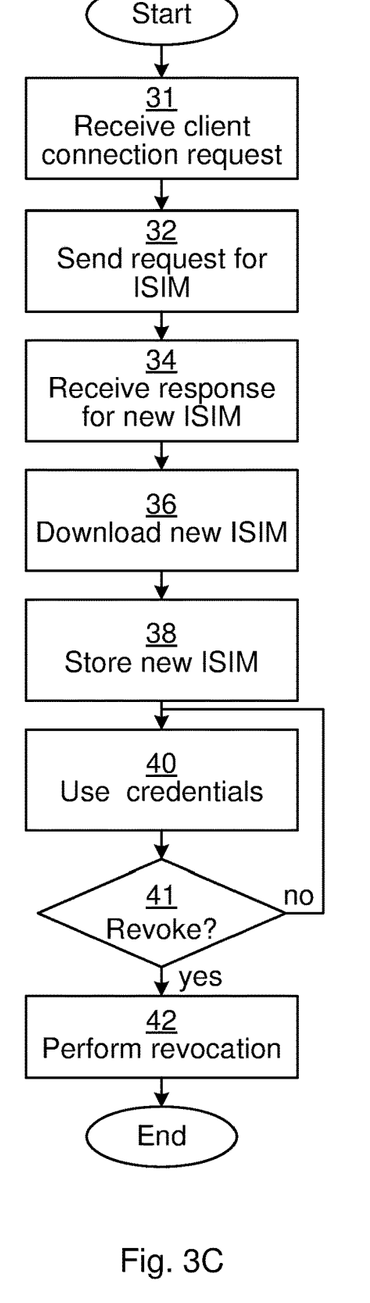

FIG. 3C is a flow chart illustrating one embodiment of a method for downloading an electronically transferable subscriber identity module. The method of FIG. 3C is similar to the method of FIG. 3B and only steps which are new or modified compared to the method of FIG. 3B are described here. In this embodiment, a trigger for requesting the ISIM is client connection request.

Hence, prior to the send request for ISIM step 32, there is here a receive client connection request step 31, which then acts a trigger condition, instead of the registration message of the embodiment of FIG. 3B, to perform the remaining steps of the method. This can be a direct trigger, e.g. by the client connection request can include indication of a need to supply credentials, whereby a need to obtain an electronically transferable subscriber identity module is established. Alternatively, this can be an indirect trigger, wherein the client connection request 19 is forwarded to the application server 3 which responds with a message that indicates that 3GPP based authentication is needed, which then triggers the remaining steps of the method. Compared to the embodiment of FIG. 3B, the electronically transferable subscriber identity module is only obtained when a need to do so is established using the client connection request. Hence, no electronically transferable subscriber identity modules are generated unnecessarily.

Figure 3D:
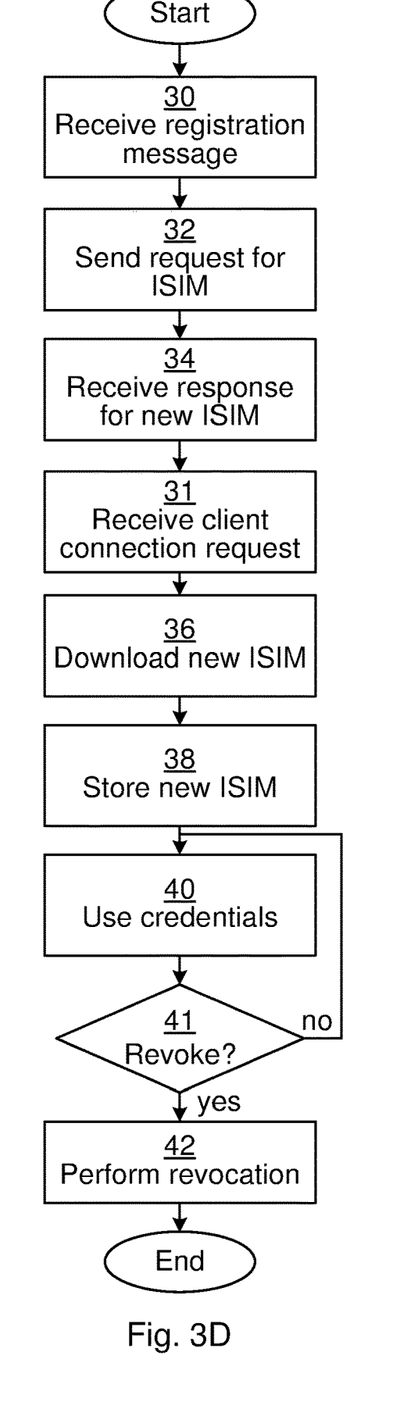

FIG. 3D is a flow chart illustrating one embodiment of a method for downloading an electronically transferable subscriber identity module. The method of FIG. 3D is similar to the method of FIG. 3B and only steps which are new of modified compared to the method of FIG. 3B are described here. In this embodiment, there is an additional trigger prior to downloading the electronically transferable subscriber identity module of the client connection request.

Hence, prior to the download new ISIM step 36, there is here a receive client connection request step 31, which then acts a trigger condition to perform the download. As explained above, the client connection request can include indication of a need to supply credentials, whereby a need to obtain an electronically transferable subscriber identity module is established, either directly or indirectly from the application server. Compared to the embodiment of FIG. 3B, the electronically transferable subscriber identity module is generated the same way, but only downloaded when a need to do so is established using the client connection request. Hence, no electronically transferable subscriber identity modules are downloaded unnecessarily.

Figure 3E:
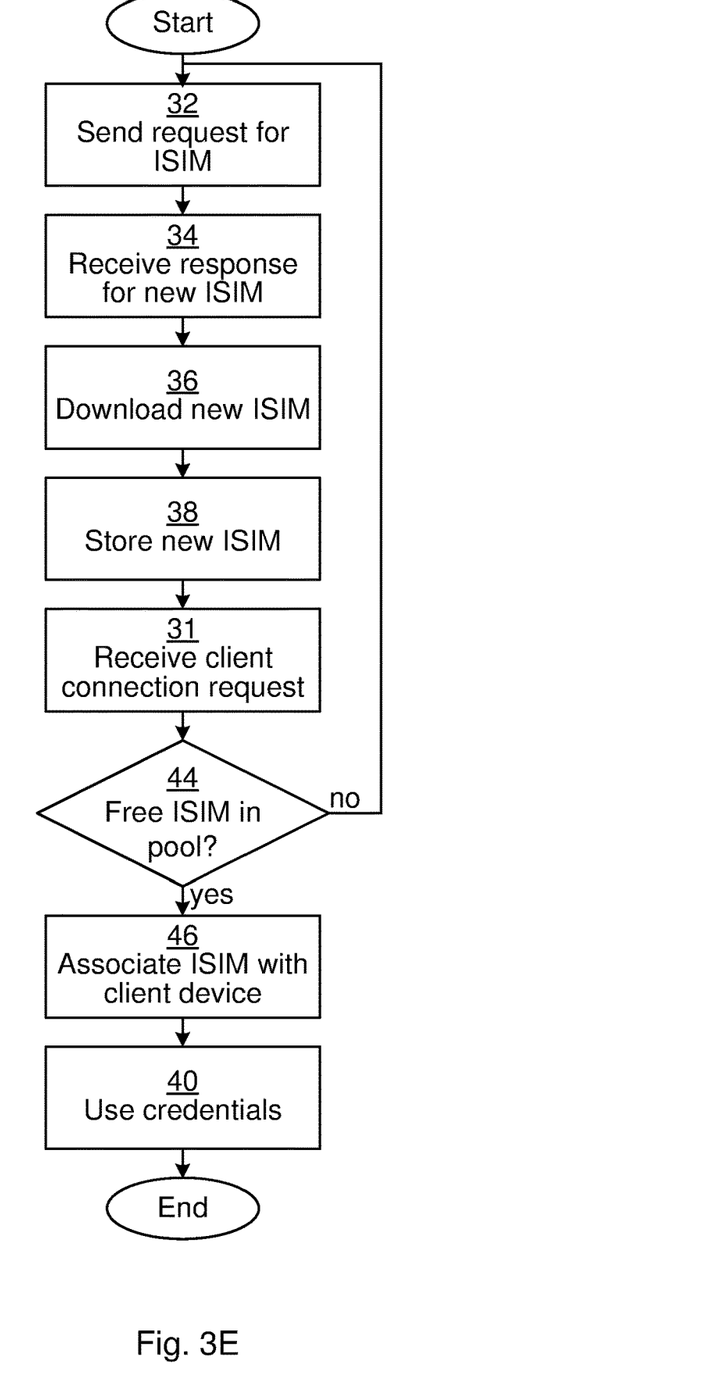

FIG. 3E is a flow chart illustrating one embodiment of a method for downloading electronically transferable subscriber identity modules. The method of FIG. 3E is similar to the method of FIG. 3A and only steps which are new of modified compared to the method of FIG. 3A are described here. In this embodiment, a pool of ISIMs is used.

The method starts with the send request for ISIM step 32. In this embodiment, this step includes a request for a suitable number of ISIMs or is repeated a suitable number of times in order to generate the same number of ISIMs. In this embodiment, the request for ISIMs does not comprise any identifier linking to the client device, since the ISIMs at this stage are only to be used in a pool of ISIMs and are not yet associated with a client device.

Correspondingly, the receive response for new ISIM step 34, download new ISIM step 36 and store new ISIM step 38 also concern the same number of ISIMs as for the send request for ISIM step 32. However, here, the ISIMs are not associated with a client device yet and are instead stored in a pool of ISIMs for use by any client device as the need arises.

In the receive client connection request step 31, a client connection request is received, requiring credentials of an electronically transferable subscriber identity module for a particular client device. The gateway then uses an ISIM in the pool of ISIMs and associates this ISIM with the client device and stores this association.

In the conditional free ISIM in pool step 44, it is determined whether there are any free ISIMs available in the pool. If this is the case, the method continues to an associate ISIM with client device step 46. Otherwise, the method returns to the send request for ISIM step 32 to fill the pool with more ISIMs.

In the associate ISIM with client device step 46, one ISIM is taken from the pool and associated with the client device which sent the client connection request. This means that there is one less ISIM available in the pool.

In the use credentials step 40, the credentials associated with the client device in question are used for communication between the client device and an application server.

It is to be noted that the receive client connection request step 31, the Conditional free ISIM in pool step 44 and the use credentials step 40 are performed on a per client device 2 basis.

After the client device is done using the ISIM, the ISIM could also be freed back to the pool of ISIMs. To determine if it is free the gateway could e.g. check when a key or session generated with the ISIM expires. If the key or session is not renewed, the ISIM can be released to the pool to be reused.

Figure 4:
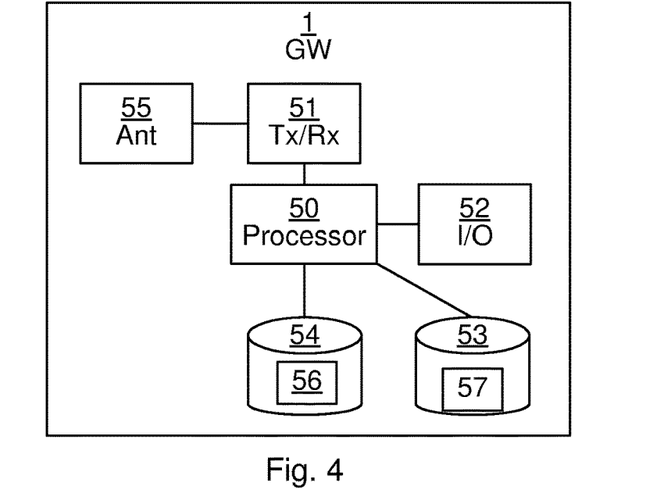
FIG. 4 is a schematic diagram showing some components of the gateway of FIG. 1.

FIG. 4 is a schematic diagram showing some components of the gateway 1 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIGS. 3A-E above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM). The memory 53 also comprises credentials 57, such as 3GPP credentials, e.g. stored in an ISIM or USIM. The ISIM or USIM can be provided using a physical card, embedded UICC or by an electronically transferable subscriber identity module such as an MCIM.

The gateway 1 further comprises an I/O interface 52 for communicating with other external entities, e.g. using a wired network connection such as Ethernet. Optionally, the I/O interface 52 also includes a user interface (not shown).

The gateway 1 also comprises one or more transceivers 51, comprising analogue and digital components, and a suitable number of antennas 55 for wireless communication with client devices and with radio base stations of a mobile communication network (to thereby gain access to one or more application servers, an ROs and an SHO). Optionally, the one or more application servers, the RO and the SHO are instead reachable via a wired IP based network, such as over an Ethernet connection or a wireless IP based network, such as Wi-Fi (any IEEE 802.11x standard).

Other components of the gateway 1 are omitted in order not to obscure the concepts presented herein.

Figure 5:
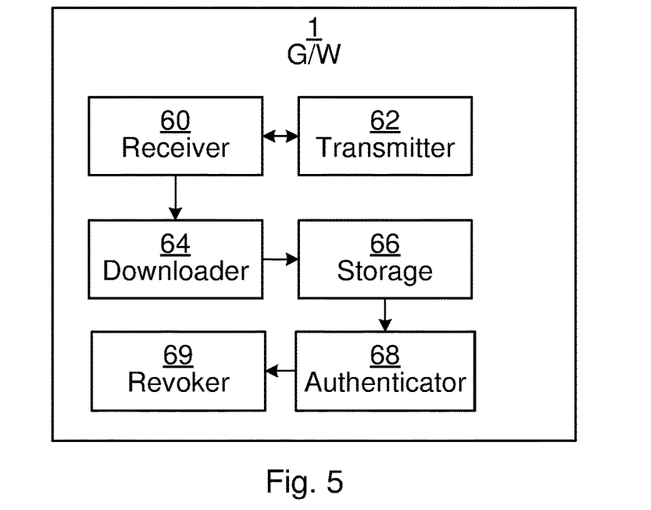
FIG. 5 is a schematic diagram showing functional modules of the gateway of FIGS 1 and 4.

FIG. 5 is a schematic diagram showing functional modules of the gateway 1 of FIGS. 1 and 4. The modules can be implemented using software instructions such as a computer program executing in the gateway 1 and/or using hardware, such as application specific integrated circuits, field programmable gate arrays, discrete logical components, transceivers, etc. The modules correspond to the steps in the methods illustrated in FIGS. 3A-E.

A receiver 60 is arranged to receive a response for new ISIM, a registration message, and a client connection request. This module corresponds to the receive response for new ISIM step 34 of FIGS. 3A-E, the receive registration message step 30 of FIGS. 3B and 3D, and the receive client connection request step 31 of FIGS. 3C-E.

A transmitter 62 is arranged to send the request for the new ISIM. This module corresponds to the send request for new ISIM step 32 of FIGS. 3A-D.

A downloader 64 is arranged to download the new ISIM. This module corresponds to the download new ISIM step 36 of FIGS. 3A-E.

A storage module 66 stores the downloaded new ISIM. This module corresponds to the store new ISIM step 38 of FIGS. 3A-D.

An authenticator module 68 notices communication between the client device 2 and the application server, and uses credentials of the ISIM for identification, authentication and/or secure communication for the client device, effectively relieving the client device of having to provide secure storage for the ISIM. This module corresponds to the use credentials step 40 of FIGS. 3B-E.

A revoker module 69 is arranged to revoke the ISIM when it is determined that this should be done. This module corresponds to the conditional revoke step 41 and the perform revocation step 42 of FIGS. 3B-D.

Figure 6:
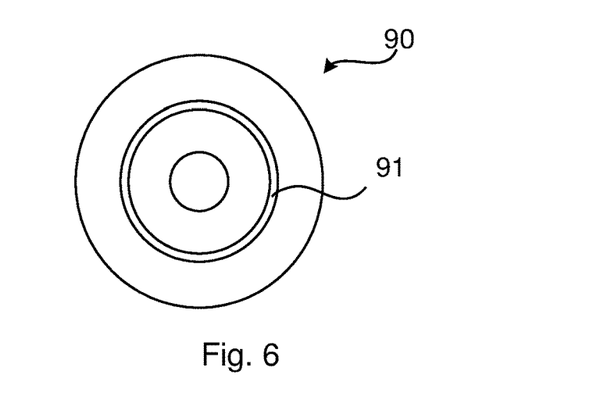
FIG. 6 shows one example of a computer program product comprising computer readable means.

FIG. 6 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 4. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a gateway for facilitating communication between a client device and an application server by obtaining and using a credential associated with the client device without the client device having to store the credential or provide the credential to the gateway, the method comprising:

the gateway obtaining a message transmitted by the client device;

after obtaining the message, the gateway sending a request for an electronically transferable subscriber identity module (SIM), the request comprising an identifier based on an identity of the client device;

the gateway receiving a response indicating that the electronically transferable SIM, generated based on the identifier, is available;

the gateway downloading the electronically transferable SIM;

the gateway storing the downloaded electronically transferable SIM with an association to the client device, thereby associating the downloaded electronically transferable SIM with the client device, wherein the downloaded electronically transferable SIM comprises the credential;

after downloading the electronically transferable SIM, the gateway receiving a client communication transmitted by the client device, wherein the client communication is destined for the application server;

the gateway encrypting the received client communication that was transmitted by the client device using the downloaded electronically transferable SIM that is associated with the client device; and the gateway forwarding the encrypted client communication to the application server, wherein the gateway does not send the electronically transferable SIM to the client device.

2. The method according to claim 1, wherein the identifier is a Session Initiation Protocol Uniform Resource Identifier (SIP URI).

3. The method according to claim 1, wherein the request comprises a parameter indicating that the gateway is requesting a newly generated electronically transferable subscriber identity module.

4. The method according to claim 1, further comprising:
the gateway obtaining the credential included in the electronically transferable SIM; and
the gateway authenticating the client device with the application server using the obtained credential stored in the electronically transferable SIM.

5. The method according to claim 1, wherein the step of downloading comprises the gateway downloading only the electronically transferable SIM which is generated based on the identifier.

6. The method according to claim 1, wherein the step of downloading comprises the gateway downloading a plurality of electronically transferable subscriber identity modules associated with the gateway.

7. The method according to claim 1, wherein the electronically transferable SIM is in the form of an Internet Protocol Multimedia Services Identity Module (ISIM).

8. The method according to claim 1, further comprising, prior to sending the request, the gateway receiving a registration message from the client device comprising the identity of the client device.

9. The method according to claim 8, further comprising the gateway receiving a client connection request prior to downloading the electronically transferable subscriber identity module.

10. The method according to claim 1, further comprising the gateway receiving a client connection request prior to sending the request.

11. The method according to claim 1, further comprising the gateway revoking the electronically transferable subscriber identity module.

12. A gateway for facilitating communication between a client device and an application server by obtaining and using a credential associated with the client device without the client device having to store the credential or provide the credential to the gateway, the gateway comprising:
a processor; and
a memory storing instructions that, when executed by the processor, enables the gateway to:
after obtaining a message transmitted by the client device, send a request for an electronically transferable subscriber identity module (SIM) that is generated based on an identifier that is based on an identity of the client device, the request comprising the identifier based on the identity of the client device;
download the electronically transferable SIM as a result of receiving a response indicating that the electronically transferable SIM is available, wherein the electronically transferable SIM was generated based on the identifier;
store the downloaded electronically transferable SIM with an association to the client device, thereby associating the downloaded electronically transferable SIM with the client device, wherein the downloaded electronically transferable SIM comprises the credential;
after downloading the electronically transferable SIM, receive a client communication transmitted by the client device, wherein the client communication is destined for the application server;
encrypt the received client communication that was transmitted by the client device using the downloaded electronically transferable SIM that is associated with the client device; and
forward the encrypted client communication to the application server, wherein
the gateway is configured to not send the electronically transferable SIM to the client device.

13. The gateway according to claim 12, wherein the identifier is in the form of a Session Initiation Protocol Uniform Resource Identifier.

14. The gateway according to claim 12, wherein the request comprises a parameter indicating that the gateway is requesting a newly generated electronically transferable subscriber identity module.

15. The gateway according to claim 12, wherein the gateway is configured to obtain the credential included in the electronically transferable SIM and authenticate the client device using based on the obtained credential.

16. The gateway according to claim 12, wherein the gateway is configured such that, as a result of receiving the response, the gateway downloads only the electronically transferable subscriber identity module.

17. The gateway according claim 12, wherein the gateway is configured such that, as a result of receiving the response, the gateway downloads a plurality of electronically transferable subscriber identity modules including the requested electronically transferable subscriber identity module.

18. The gateway according to claim 12, wherein the electronically transferable SIM is in the form of an Internet Protocol Multimedia Services Identity Module.

19. The gateway according to claim 12, wherein the gateway is configured to send the request after receiving a registration message from the client device comprising the identity of the client device.

20. The gateway according to claim 19, wherein the gateway is configured such that the gateway downloads the electronically transferable SIM as a result of receiving a client connection request.

21. The gateway according to claim 12, wherein the gateway is configured to send the request after receiving a client connection request.

22. The gateway according to claim 12, wherein the gateway is operable to revoke the electronically transferable subscriber identity module.

23. A computer program product for facilitating communication between a client device and an application server by obtaining and using a credential associated with the client device without the client device having to store the credential or provide the credential to a gateway, the computer program product comprising a non-transitory computer readable medium storing computer program code which, when run on the gateway, causes the gateway to:
after obtaining a message transmitted by the client device, send a request for an electronically transferable subscriber identity module (SIM) that is generated based on an identifier that is based on an identity of the client device, the request comprising the identifier based on the identity of the client device;
download the electronically transferable SIM as a result of receiving a response indicating that the electronically transferable SIM is available, wherein the electronically transferable SIM was generated based on the identifier;
store the downloaded electronically transferable SIM with an association to the client device, thereby associating the downloaded electronically transferable SIM with the client device, wherein the downloaded electronically transferable SIM comprises the credential;
after downloading the electronically transferable SIM, receive a client communication transmitted by the client device, wherein the client communication is destined for the application server;
encrypt the client communication using the electronically transferable SIM; and
forward the encrypted client communication to the application server, wherein
the gateway is configured to not send the electronically transferable SIM to the client device.

24. The computer program product according to claim 23, wherein the request comprises a parameter indicating that the gateway is requesting a newly generated electronically transferable subscriber identity module.

25. The method of claim 1, wherein
the message is a connection request destined for the application server, and
the content of the message triggers the gateway to send the request for the electronically transferable SIM.

26. The method of claim 1, wherein
the message is a connection request destined for the application server,
after forwarding the connection request to the application server, the gateway receives a response message transmitted by the application server in response to the connection request, and
the content of the response message triggers the gateway to send the request for the electronically transferable SIM.

27. The method of claim 1, wherein
the message is a connection request destined for the application server, and
the method further comprises, after downloading the electronically transferable SIM, forwarding to the application server a message comprising the connection request and the credential.

28. A method performed by a gateway for facilitating communication between a client device and an application server, the method comprising:
the gateway storing a set of two or more subscriber identity modules (SIMs);
after storing the SIMs, the gateway receiving a message transmitted by the client device;
after receiving the message, the gateway determining whether any of the SIMs included in the set of SIMs is free to be used in connection with the client device;
the gateway selecting a free SIM from the set of SIMs;
the gateway assigning the selected SIM to the client device;
after assigning the selected SIM to the client device, the gateway receiving a client communication transmitted by the client device, wherein the client communication is destined for the application server;
the gateway encrypting the received client communication that was transmitted by the client device using the SIM assigned to the client device; and
the gateway forwarding the encrypted client communication to the application server, wherein
the gateway does not send the SIM to the client device.

* * * * *